(No Model.)
R. DELONG.
MEAT TENDERER.
No. 572,527. Patented Dec. 8, 1896.
Fig. 1.
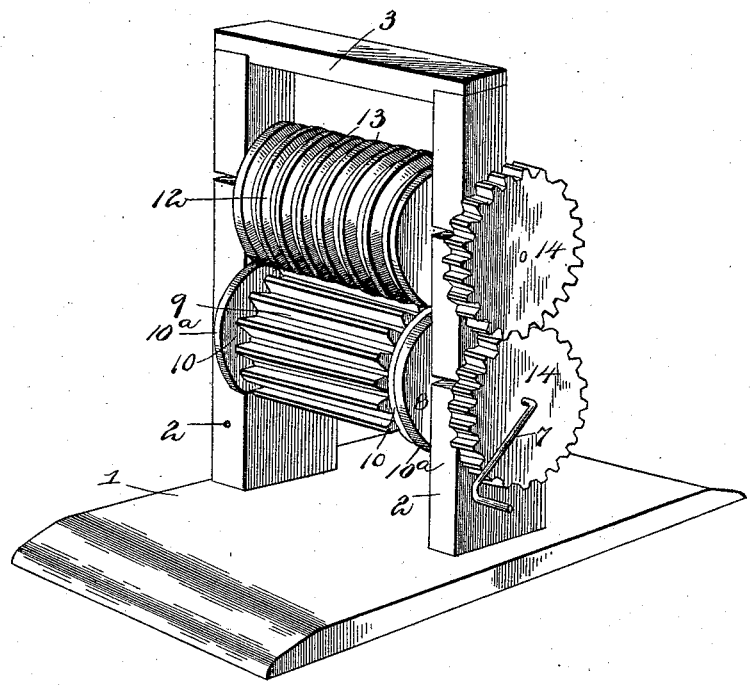
Fig. 2.
Fig. 3.
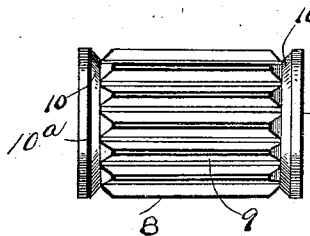
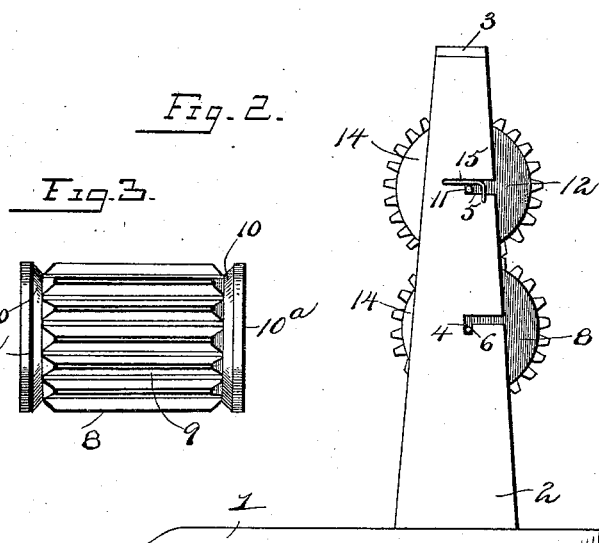
Inventor
Richard Delong.
Witnesses
L. Kieser
Jno. W. Cromwell
By his Attorneys,
C. A. Snow & Co.

UNITED STATES PATENT OFFICE.

RICHARD DELONG, OF TORCH LAKE, MICHIGAN.

MEAT-TENDERER.

SPECIFICATION forming part of Letters Patent No. 572,527, dated December 8, 1896.

Application filed March 31, 1896. Serial No. 585,636. (No model.)

*To all whom it may concern:*

Be it known that I, RICHARD DELONG, a citizen of the United States, residing at Torch Lake, in the county of Antrim and State of Michigan, have invented a new and useful Meat-Tenderer, of which the following is a specification.

This invention relates to improvements in meat-tenderers; and it has for its object to provide a machine of this character which shall be so constructed as to permit the crushing-rolls thereof to be easily removed for cleansing purposes, and also to form the rolls in such manner as to retain thereon the juice of the meat being operated upon, whereby such meat will remain juicy and sweet.

To these ends the invention consists, substantially, in the combination and arrangement of parts, as will be hereinafter more fully illustrated, described, and claimed.

In the accompanying drawings, Figure 1 is a perspective view of a meat-tenderer constructed in accordance with the present invention. Fig. 2 is a side elevation thereof. Fig. 3 is a side elevation of one of the crushing-rolls.

Similar numerals of reference indicate corresponding parts throughout the figures.

Referring to the drawings, 1 designates a base formed of any suitable material, and projecting upwardly therefrom is a pair of standards 2, the top ends of which are connected by a cross-piece 3. The standards 2, at opposite points, are provided with inverted-L-shaped bearings 4, and above such bearings and in alinement therewith are provided notches 5, which also form bearings, for a purpose to be hereinafter described. Journaled in the L-shaped bearings 4 is a shaft 6, such shaft terminating at one of its ends in a crank 7, and mounted upon this shaft 6 is a crushing-roll 8. This crushing-roll is provided with a series of longitudinal corrugations 9, the ends of such corrugations intersecting peripheral juice-grooves 10, arranged at right angles to the corrugations 9 at each end of the roll 8; and the extreme ends of said roll 8 form plain peripheral heads 10ª, which prevent the juice pressed from the meat being operated upon leaving the grooves 10 and passing over said ends, thereby retaining such juice upon the roll, so that the same may be again absorbed by the meat and the latter remain sweet and well-flavored.

Journaled in the bearings 5 is a shaft 11, such shaft having mounted thereon a crushing-roll 12, provided with a series of transverse corrugations 13.

Mounted upon the shafts 6 and 11 and at one side of one of the standards 2 is a pair of pinions 14, such pinions meshing with each other, and by means of the crank 7 imparting simultaneous motion to the rolls 8 and 12.

For retaining the shaft 11 in its bearings 5 hooks 15 are pivoted at the side of the standards 2 immediately adjacent to the bearings 5, and these hooks pass over the ends of the shaft 11 and securely hold the same in the notched bearings 5. It will therefore be seen that by reason of the roll 12 being held in its bearings all possibility of the roll 8 passing from the L-shaped bearings 4 will be overcome.

The operation and advantages of the herein-described meat-tendering machine will be readily understood by those skilled in the art. When it is desired to operate upon a piece of meat, the latter is inserted between the rolls 8 and 12, and by turning the crank 7 simultaneous motion is imparted to the rolls 8 and 12 through the pinions 14. It will therefore be apparent that the meat may be passed between these rolls as long as desired, the juice pressed from the meat collecting in the juice-grooves 10 and remaining upon the roll 8. This is a decided advantage, from the fact that the juice will not pass from the roll 8, but will be again absorbed by the meat, thus leaving the latter sweet and well-flavored instead of dry and tasteless, as would be the case were the juice lost.

Having thus described my invention, what I claim is—

In a meat-tenderer, the combination of a base having standards projecting upwardly therefrom, crushing-rolls journaled in said standards, one of said crushing-rolls provided with a series of transverse corrugations, the other roll provided at its ends with plain peripheral heads and having a series of longitudinal corrugations intermediate said heads, said roll also having peripheral juice-grooves formed at the ends of and intersected by said longitudinal corrugations, said juice-grooves adapted to collect the juice pressed from the meat being operated upon and retain the same on the roll, substantially as set forth.

In testimony that I claim the foregoing as my own I have hereto affixed my signature in the presence of two witnesses.

RICHARD DELONG.

Witnesses:
ALEX. CAMERON,
CHAS. LA PLANT.